UNITED STATES PATENT OFFICE.

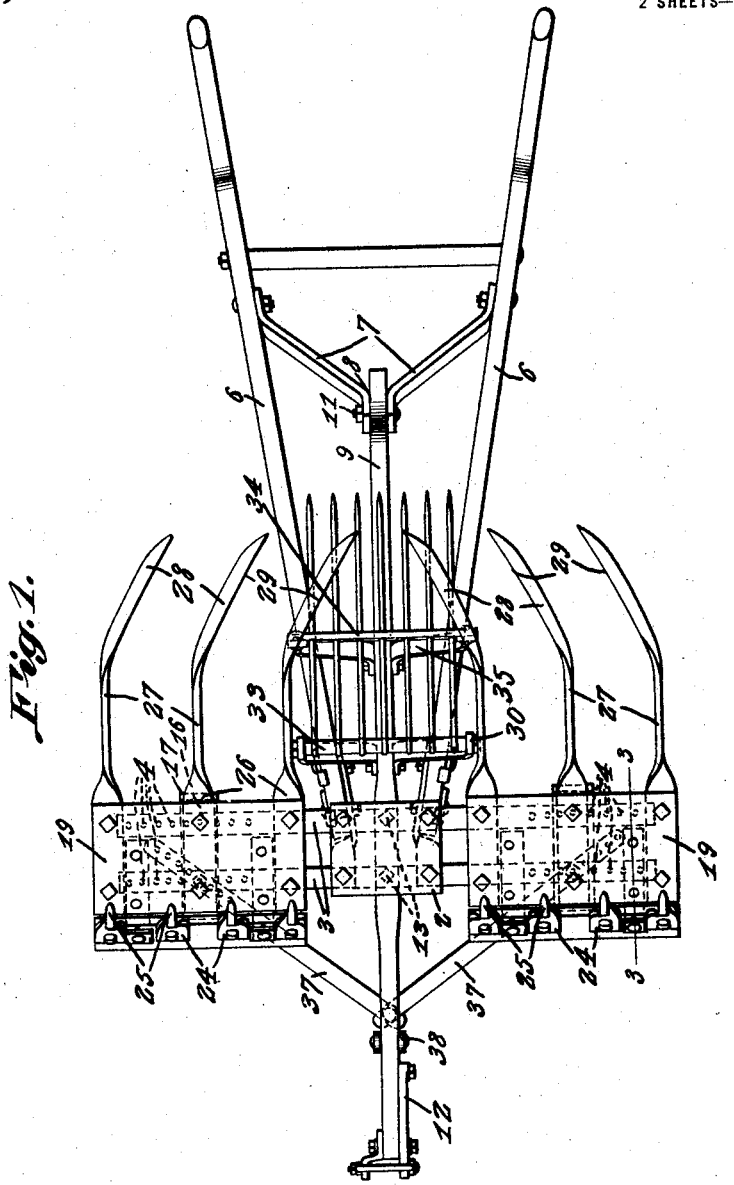

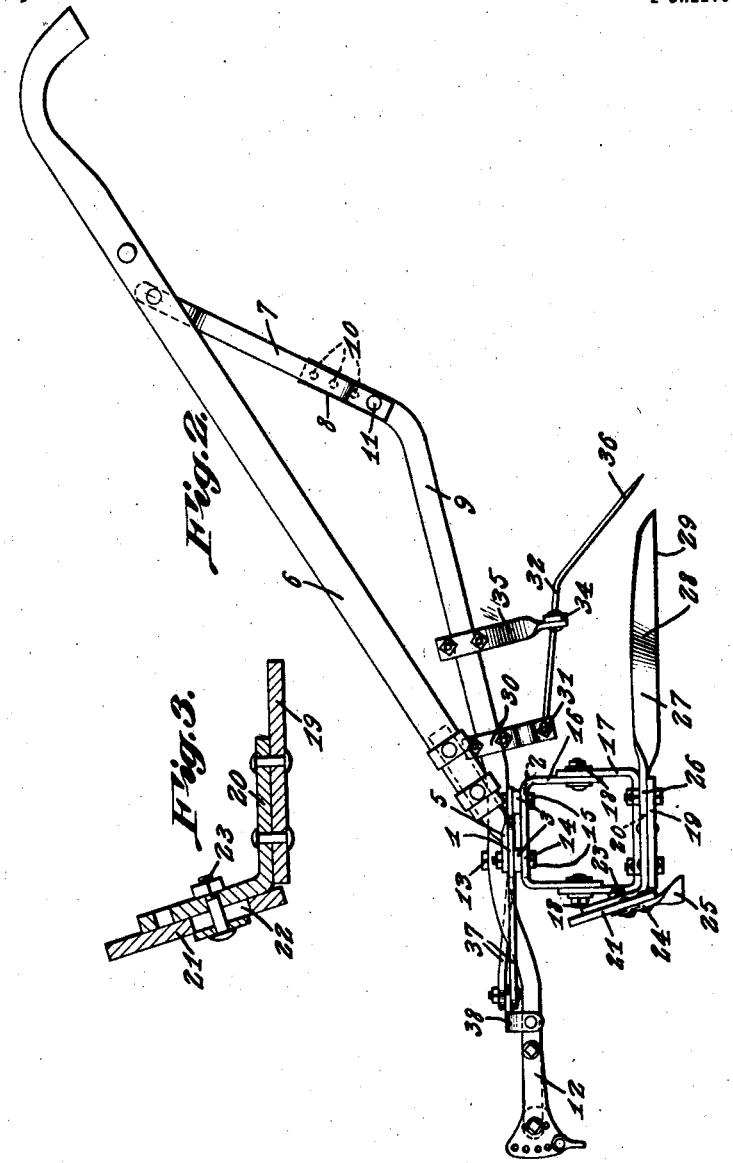

JAMES W. MONTGOMERY, OF THOMASVILLE, GEORGIA.

COMBINED HARROW AND CULTIVATOR.

1,350,376.  Specification of Letters Patent.  Patented Aug. 24, 1920.

Application filed January 26, 1920. Serial No. 354,074.

*To all whom it may concern:*

Be it known that I, JAMES W. MONTGOMERY, a citizen of the United States, residing at Thomasville, in the county of Thomas and State of Georgia, have invented a new and useful Combined Harrow and Cultivator, of which the following is a specification.

This invention relates to a combined harrow and cultivator, one of its objects being to provide a device of this character which will not drag or choke, and which, when in operation as a harrow, will cut grass and weeds under the surface of the soil, there being an arrangement of soil engaging devices whereby the device can be used to barr of cotton plants, peanuts, etc., after which by reversing certain of the parts, the device can be used to dish both sides of the furrow at once.

A further object is to provide a weeder of novel form combined with the device and which is readily adjustable to a desired elevation.

With the foregoing and other objects in view the invention resides in the combination and arrangement of parts and in the details of construction, it being understood that changes in the precise embodiment of the invention herein disclosed can be made within the scope of what is claimed without departing from the spirit of the invention.

In the accompanying drawings the preferred form of the invention has been shown.

In said drawings:—

Figure 1 is a bottom plan view of the machine.

Fig. 2 is a side elevation.

Fig. 3 is an enlarged section on line 3—3 of Fig. 1.

Referring to the drawings by characters of reference 1 and 2 designate superposed plates between which are extended parallel transverse cross strips 3 each end portion of each strip being provided with a longitudinal series of apertures as indicated at 4. To the upper strip 1 are secured brackets 5 from which are extended handles 6. These handles are suitably connected, as ordinarily, and are provided with downwardly converging brace strips 7 receiving between them the upwardly extending rear end portion 8 of a beam 9. A series of openings 10 are formed in the portion 8 and any one of them is adapted to receive a bolt 11 extending transversely through the braces. The beam 9 is extended forwardly over the plate 1 and between the handles 6 and thence to a clevis 12 arranged at the front end thereof. The said beam 9 is bolted to the top plate 1 as indicated at 13.

Detachably and adjustably connected to the end portions of the cross strip 3 are upstanding frames 14 the fastening bolts 15 of which are adapted to be inserted into any of the openings 4. Each frame 14 includes an upper yoke 16 and a lower yoke 17, the ends of the two yokes lapping and being detachably connected by bolts 18. To the bottom of each yoke 17 is secured a bottom plate 19 and secured to the bottom plate 19 are metal strips 20, the front ends of which are inclined upwardly and forwardly. A breast plate 21 is secured to the upward portions of the strips, one of these breast plates being rotated at the front of each of the bottom plates 19, and each breast plate having slots 22 for the reception of fastening bolts 23 extending into the front portions of the strips 20.

Bolted or otherwise secured to each breast plate 20 are the shanks 24 of harrow teeth 25, the teeth extending downwardly below the level of the plate 19 as shown particularly in Fig. 2.

Secured on each bottom plate is a series of shanks 26 provided at the front ends of rearwardly extending fingers 27 the rear portions of which are twisted to form cutting blades 28, said blades being diagonally disposed so as to provide rearwardly diagonally arranged cutting edges 29. The blades 28 of each series are disposed oppositely to the blades of the other series and these blades can be positioned so as to converge rearwardly as shown in Fig. 1, or, under some conditions, can be reversed or transposed so as to diverge rearwardly as will be obvious.

By detaching the yokes 17 from the yokes 16 the groups of blades 28 can be quickly transposed. By means of the bolts 15 and the series of openings 4 the series of blades 28 can be adjusted toward or from each other. By providing the slots 22 the harrow piece 25 can be adjusted upwardly or downwardly relative to the bottom plates 19, thus to regulate the depth of the cut by the teeth.

A bracket 30 is clamped on the beam 9 back of and close to the strips 3 and extends downwardly below the beam. The lower end of this bracket forms a yoke on which is mounted a pivot rod 31 on which spring fingers 32 are pivotally mounted, these fingers being spaced apart by sleeves 33 mounted on the pivot rod. The fingers are extended through a supporting plate 34 suspended from a bracket 35 which is adjustably mounted on the beam 9. The fingers are inclined downwardly and rearwardly and merge into abruptly inclined end portions 36 which are preferably pointed and constitute means for engaging the surface of the soil and tearing weeds therefrom. As the bracket 35 is longer than the bracket 30 it will be obvious that by adjusting said bracket 35 along the beam 9 the fingers 32 can either be raised or lowered as desired, thus to increase or reduce the distance between the points of the fingers and the surface of the soil.

Forwardly converging brace strips 37 are connected to the cross strips 3 and are attached, at their front ends, to a bracket 38 secured on the beam 9.

It will be apparent that when the device is drawn forward the piece 25 will cut into the soil, the blade 28 will cut under the surface of the soil, thereby severing the roots of weeds, etc. and at the same time deflecting the weeds laterally toward the center of the machine. The fingers 32 with their end portions 36 will operate to tear the weeds out of the ground and to gather any loose weeds that may be directed into the paths thereof.

What is claimed is:—

1. The combination with a beam, a cross strip connected thereto, and depending frames secured to the cross strip, of a bottom plate secured to each frame, rearwardly extending blades carried by each plate, said blades having obliquely disposed cutting edges, a breast plate adjustably connected to each bottom plate, and means carried by each breast plate for cutting downwardly into the soil.

2. The combination with a beam, a cross strip secured thereto, bottom plates detachably and adjustably connected to the cross strip, a breast plate upstanding from and adjustably connected to the front portion of each bottom plate, means upon the breast plates for making vertical cuts into the surface of the soil during the forward movement of the machine, and means connected to the bottom plate and extending rearwardly therefrom for making cuts transversely of said vertical cuts.

3. The combination with a beam and a cross strip connected thereto, of bottom plates detachably and adjustably connected to the cross strip, rearwardly extending series of fingers upon the bottom plates, obliquely extending cutting blades at the rear ends of the fingers and having their rearwardly extending edges sharpened, and means adjustably connected to the front portions of the bottom plates for cutting downwardly into the surface of the soil.

4. The combination with a beam, of parallel transverse strips secured thereto, yokes adjustably connected to and depending from said strips, yokes detachably connected to the depending yokes, bottom plates secured to the detachable yokes, a breast plate upstanding from and inclined relative to each bottom plate, said breast plates being adjustably mounted, soil engaging feet carried by the breast plates, rearwardly extending obliquely disposed blades connected to each of the bottom plates, said blades having obliquely disposed cutting edges.

In testimony that I claim the foregoing as my own, I have hereto affixed my signature in the presence of two witnesses.

JAMES W. MONTGOMERY.

Witnesses:
J. S. MONTGOMERY,
ELDON L. JONES.